US007720985B2

(12) United States Patent
Yoneda (10) Patent No.: US 7,720,985 B2
(45) Date of Patent: May 18, 2010

(54) CONTENT RECEIVING APPARATUS AND CONTENT RECEIVING METHOD

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 504 days.

(21) Appl. No.: 11/502,297

(22) Filed: Aug. 10, 2006

(65) Prior Publication Data

US 2007/0050479 A1 Mar. 1, 2007

(30) Foreign Application Priority Data

Aug. 24, 2005 (JP) ............................. 2005-242363

(51) Int. Cl.
*G06F 15/16* (2006.01)
*H04N 7/173* (2006.01)
(52) U.S. Cl. .................. 709/231; 709/219; 725/105
(58) Field of Classification Search ................. None
See application file for complete search history.

(56) References Cited

U.S. PATENT DOCUMENTS

| 6,901,462 | B2 * | 5/2005 | Minoshima et al. ........... 710/29 |
| 7,092,615 | B2 | 8/2006 | Tanikawa et al. |
| 7,349,976 | B1 * | 3/2008 | Glaser et al. ................ 709/231 |
| 2002/0073136 | A1 * | 6/2002 | Itoh et al. .................... 709/200 |
| 2004/0249969 | A1 * | 12/2004 | Price .......................... 709/231 |
| 2004/0267952 | A1 * | 12/2004 | He et al. ...................... 709/231 |
| 2006/0195509 | A1 | 8/2006 | Yoneda |

FOREIGN PATENT DOCUMENTS

| JP | 02-128587 A | 5/1990 |
| JP | 03-169181 A | 7/1991 |
| JP | 2001-242876 A | 9/2001 |
| JP | 2001-243694 A | 9/2001 |

(Continued)

OTHER PUBLICATIONS

Roku Inc: "SoundBridge Network Music Player User Guide Software v. 2.1"; www.Roku.com, [online] Jan. 20, 2005, XP002381038 retrieved from the Internet: URL:http//web.archive.org/web/20050401115809/www.rokulabs.com/support/SB-guide-web-012005.pdf] [retrieved on May 15, 2005]; pp. 17, 18, 20, 25.

(Continued)

*Primary Examiner*—Wen-Tai Lin
(74) *Attorney, Agent, or Firm*—Wolf, Greenfield & Sacks, P.C.

(57) ABSTRACT

A content receiving apparatus has: a communicating unit connecting to a server; a reception buffer receiving and storing transmitted content data; a content reproducing unit reproducing the read-out content data; a controller controlling the communicating unit and the reception buffer; and an operating unit supplying an operation signal to the control unit. The data reception and the data output to the reproducing unit from the buffer are stopped by a reproduction temporary stop instruction. The data reception is restarted by a reproduction temporary stop cancellation instruction. The received content data is written into the buffer. The reception of a disconnection signal from the server is discriminated after the restart of the data reception. If the signal is not received, a predetermined amount of received data is written into the buffer, the reading is started, the data is outputted to the reproducing unit, and the reproduction is restarted.

19 Claims, 7 Drawing Sheets

FOREIGN PATENT DOCUMENTS

| | | |
|---|---|---|
| JP | 2001-265632 A | 9/2001 |
| JP | 2001-283018 A | 10/2001 |
| JP | 2002-073041 A | 3/2002 |
| JP | 2002-100120 A | 4/2002 |
| JP | 2002-108687 A | 4/2002 |
| JP | 2002-157201 A | 5/2002 |
| JP | 2003-006026 A | 1/2003 |
| JP | 2003-036654 A | 2/2003 |
| JP | 2004-086558 A | 3/2004 |
| JP | 2004-241095 A | 8/2004 |
| JP | 2004-274619 | 9/2004 |
| JP | 2005-005964 A | 1/2005 |
| JP | 2005-150961 A | 6/2005 |
| JP | 2005-167891 A | 6/2005 |
| JP | 2005-276349 A | 10/2005 |

OTHER PUBLICATIONS

Staff: "Itunes 4 tip—Sharing Itunes Libraries Over IP, It's not just for Rendezvous" Mac Observer, [online] Apr. 29, 2003, XP002381039 retrieved from the Internet: URL:http://www.macobserver.com/article/200 3/04/28.14.shtml>[retrieved on May 15, 2006]; whole doc.

Gene_Wood: "WINAMP.com Forums—Windows 2k and XP. Winamp stops the stream." [online]; Jan. 2, 2005, XP002381040 Retrieved from the Internet: URL:http://forums.winamp.com/showthread.php?postid=1243009> [retrieved on May 15, 2006; pp. 6, 10.

Sawg: "The unofficial M3U and PLS Specification" www.SCVI.net, [online]; Feb. 4, 2005, XP002381041 retrieved from the Internet: URL:http//ww.scvi.net/pls.htm> [retrieved on May 15, 2006] ¶ 1 and 5.

Iprogram Development: "MP3 Playlist-Create MP3 Playlist with Visual MP3" Iprogram Development, [online] Feb. 2, 2004, XP002381042 retrieved from the Internet: URL:http//web.archive.org/web/20040202053920/http://www.iprogramdev.com/vmp3/mp3-playlister.htm> [retrieved on May 15, 2006; whole doc.

P. Cosson: "Slim Devices Introduces Slimserver", Slim Devices Official Website, [online] Nov. 18, 2003, XP002381043; retrieved from the Internet: URL:http://www.slimdevices.com/au_press _slimserver.html> [retrieved on May 15, 2006]; whole doc.

* cited by examiner

| CONTENT NO. | NAME OF CONTENT | CONTENT TYPE | SAMPLING FREQUENCY | THE NUMBER OF CHANNELS | THE NUMBER OF BITS | URL |
|---|---|---|---|---|---|---|
| 1 | ... | PCM | ... | ... | ... | ... |
| 2 | ... | PCM | ... | ... | ... | ... |
| 3 | ... | MP3 | ... | ... | ... | ... |
| 4 | ... | PCM | ... | ... | ... | ... |
| 5 | ... | PCM | ... | ... | ... | ... |
| 6 | ... | PCM | ... | ... | ... | ... |
| 7 | ... | ATRAC | ... | ... | ... | ... |
| 8 | ... | ... | ... | ... | ... | ... |
| ... | | | | | | |

CONTENT RECEIVING APPARATUS AND CONTENT RECEIVING METHOD

CROSS REFERENCES TO RELATED APPLICATIONS

The present invention contains subject matter related to Japanese Patent Application JP 2005-242363 filed in the Japanese Patent Office on Aug. 24, 2005, the entire contents of which being incorporated herein by reference.

BACKGROUND OF THE INVENTION

1. Field of the Invention

The invention relates to a content receiving apparatus and a content receiving method which can receive content such as music content or the like transmitted from a server to a client and reproduce the distributed music content in the client.

2. Description of the Related Arts

A content distributing system in which a client requests content in a server through a network, the server transmits the content to the client, and the client reproduces the content has been known. For example, a system in which a home LAN (Local Area Network) is set and music content received from the server is reproduced by speakers in a room away from the server can be constructed. Also in such a content distributing system, in a manner similar to a reproducing player of a media, it is desirable to have a pause function for temporarily stopping the reproduction by the reproduction temporarily stopping (hereinafter, referred to as "pause") operation and starting the reproduction from a point of time of the temporary stop by the cancellation of the pause. For example, such a technique that an image without a disturbance is provided at the time of the pause cancellation in a motion image distributing system has been disclosed in JP-A-2004-274619 (Patent Document 1).

A network protocol called TCP (Transmission Control Protocol)/IP (Internet Protocol) is used to distribute the content, for example, music content to the client through the network. In such a system, the pause is performed as will be explained hereinbelow.

When the client instructs the pause, he stops the reception of data and continues the connection to the server. The stop of the data reception corresponds to a process for setting a window size to 0. The server receives the window size set in ACK (Acknowledgement) from the client. Since it is difficult for the server to transmit the data exceeding the window size, if the window size is set to 0, the server also stops the transmission of the data. In this state, data in a reception buffer is held and zero data is continuously transmitted to a D/A converter.

Subsequently, when the pause is cancelled by the user's operation in the client, the window size is set to a predetermined size from 0 and the data reception is restarted. The received data is sent to the D/A converter and the reproduction of the music content is restarted.

SUMMARY OF THE INVENTION

In the method for the pause in the content distributing system using the TCP in the related art, when an amount of data which is transmitted and received once by the server is larger than that by the client, if the client stops the data reception with the connection continued for the purpose of performing the pause, the non-transmission data remains on the server side. In the case of disconnecting the connection by an application program of the server side, the server transmits the non-transmission data to the client before the server disconnects the connection, thereafter, sets a flag FIN to "1", and disconnects the connection.

If the client restarts the data reception by the pause cancellation upon disconnection of the connection by the server side, a state where the connection is disconnected after the client received the non-transmission data occurs. That is, since the data is continuously sent, the client regards that the connection is continued and he starts the reproduction. However, since the connection is disconnected by the server side after the reception of the non-transmission data, the client requests the data from the server from the position where the transmission has been stopped or paused again. At this time, there is such a problem that a reproduction sound is temporarily cut.

It is, therefore, desirable to provide a content receiving apparatus and a content receiving method which can normally execute the pause operation.

According to an embodiment of the present invention, there is provided a content receiving apparatus comprising: a communicating unit connecting to a server; a reception buffer receiving content data transmitted from the server through the communicating unit and storing the received content data; a content reproducing unit reproducing the content data read out of the reception buffer; a control unit controlling the communicating unit and the reception buffer; and an operating unit supplying an operation signal to the control unit, wherein the control unit stops the reception of the content data and stops an output of the content data to the reproducing unit from the reception buffer in accordance with a reproduction temporary stop instruction which is supplied from the operating unit, restarts the reception of the content data in accordance with a reproduction temporary stop cancellation instruction which is supplied from the operating unit, writes the received content data into the reception buffer, discriminates whether or not a signal to disconnect the connection has been received from the server after the restart of the reception of the content data, if the signal to disconnect the connection is not received, writes a predetermined amount of received content data into the reception buffer, thereafter, starts the reading from the reception buffer, outputs the read-out data to the reproducing unit, and restarts the reproduction.

According to another embodiment of the present invention, there is provided a content receiving method comprising: a reproducing step of receiving content data from a server, writing the content data into a reception buffer, reading out the content data from the reception buffer, and outputting the read-out content data to a reproducing unit; a step of generating a reproduction temporary stop instruction in the reproducing step; a reproduction temporary stopping step of stopping the reception of the content data and stopping an output of the content data to the reproducing unit from the reception buffer in accordance with the reproduction temporary stop instruction; a step of restarting the reception of the content data in accordance with a reproduction temporary stop cancellation instruction and writing the received content data into the reception buffer; a step of discriminating whether or not a signal to disconnect the connection has been received from the server after the restart of the reception of the content data; and a step of, if the signal to disconnect the connection is not received, writing a predetermined amount of received content data into the reception buffer, thereafter, starting the reading from the reception buffer, outputting the read-out data to the reproducing unit, and restarting the reproduction.

According to the embodiment of the invention, upon reproduction, an area of a size of a transmission buffer of the server or larger is assured as a writable reusable area in the reception buffer with a construction of a ring buffer. Upon cancellation of the reproduction temporary stop, the writing into the reception buffer is started first. When a write data amount is equal to or larger than the size of transmission buffer, the data is outputted to the reproducing unit from the reception buffer and the reproducing operation is restarted. If the signal to disconnect the connection is received from the server side after the start of the writing into the reception buffer, whether or not up to the last data of the content has been received is discriminated. If up to the last data is not received, after the remaining content data was received from the server, the reproduction is restarted. Consequently, the interruption of the reproduction after the non-transmission data was reproduced can be prevented.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 1:
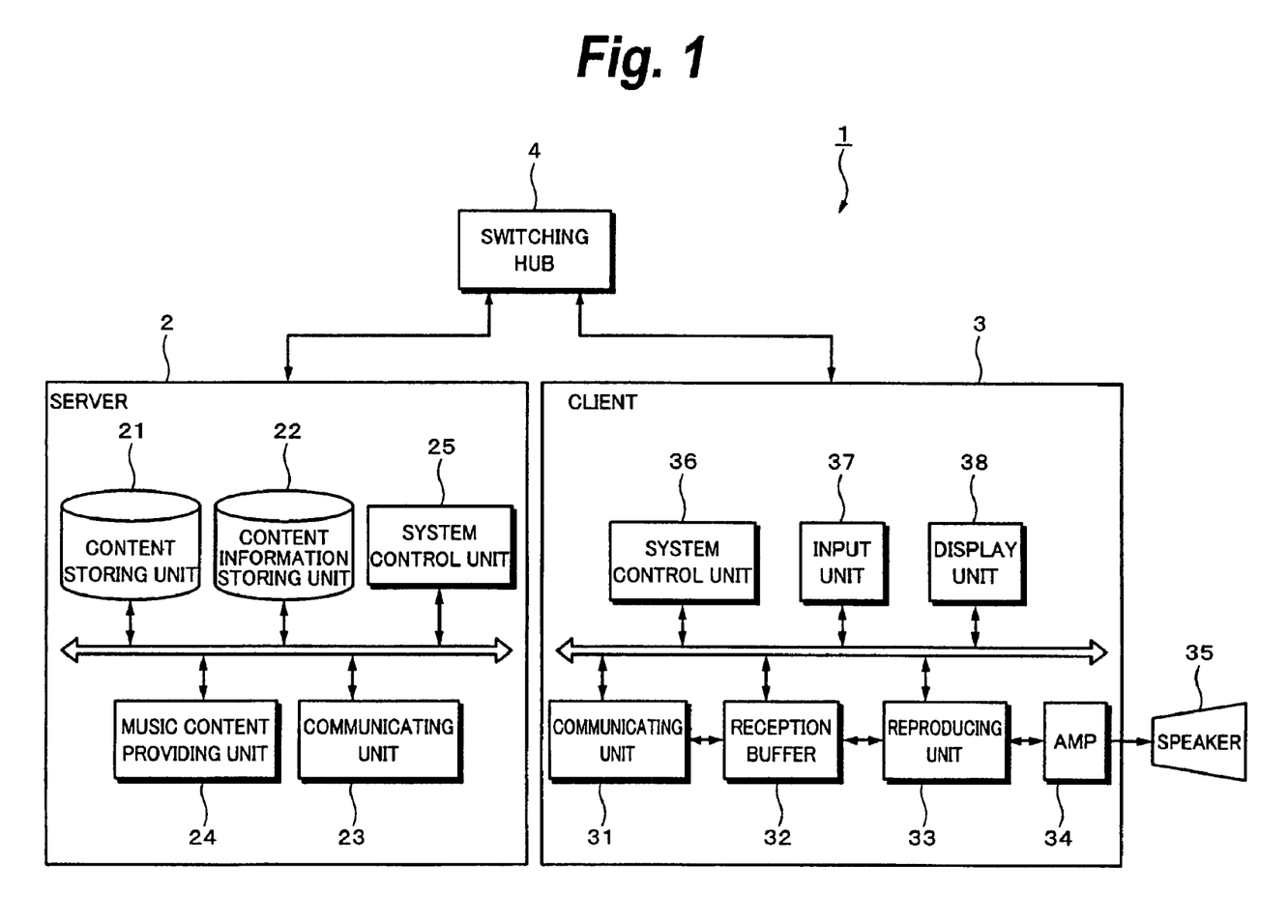
FIG. 1 is a block diagram of an embodiment of a content distributing system according to the invention.

An embodiment of the invention will be described hereinbelow with reference to the drawings. In FIG. 1, reference numeral 1 denotes a content reproducing system according to the embodiment. The content reproducing system 1 has a construction in which a server 2 for distributing content and a client 3 for reproducing the content are connected through a network such as LAN. The network 3 maybe either a wired network or a wireless network. In this example, the wired LAN is used and a switching hub 4 for relaying communication is provided. The server 2 and the client 3 which are set in different rooms are connected through, for example, the home LAN. The "content" denotes whole information such as text, still image, motion image, music, and the like which can be monitored. The embodiment relates to an example in which music content is reproduced.

The client 3 can execute streaming reproduction for reproducing the content data while receiving it by a network protocol called TCP (Transmission Control Protocol)/IP (Internet Protocol). The TCP is a transmission control protocol and enables communication between processes which are being executed by different computers. The IP is a protocol for enabling data transmission between the computers on different networks. On the basis of a received IP address, the IP designates a path by deciding the path along which the transferred information should be transmitted. On a communication path of a hardware level, data is transmitted and received in a form of a packet. A transmitting source address, data which is transferred, and a destination address are included in each packet.

The server 2 is constructed by: a content storing unit 21 in which music content has been stored; a content information storing unit 22 in which content information regarding the music content has been stored; a communicating unit 23 for communicating with the client 3; a music content providing unit 24 for making a service to provide the music content; and a system control unit 25 for controlling the whole operation of the server 2. A buffer for transmission has been provided for the communicating unit 23.

The content storing unit 21 has a construction in which a number of music content have been stored on, for example, a hard disk. The content information regarding the stored music content has been stored in the content information storing unit 22. The content information is information regarding the music pieces based on a unit such as album, artist, or the like.

Figure 2:
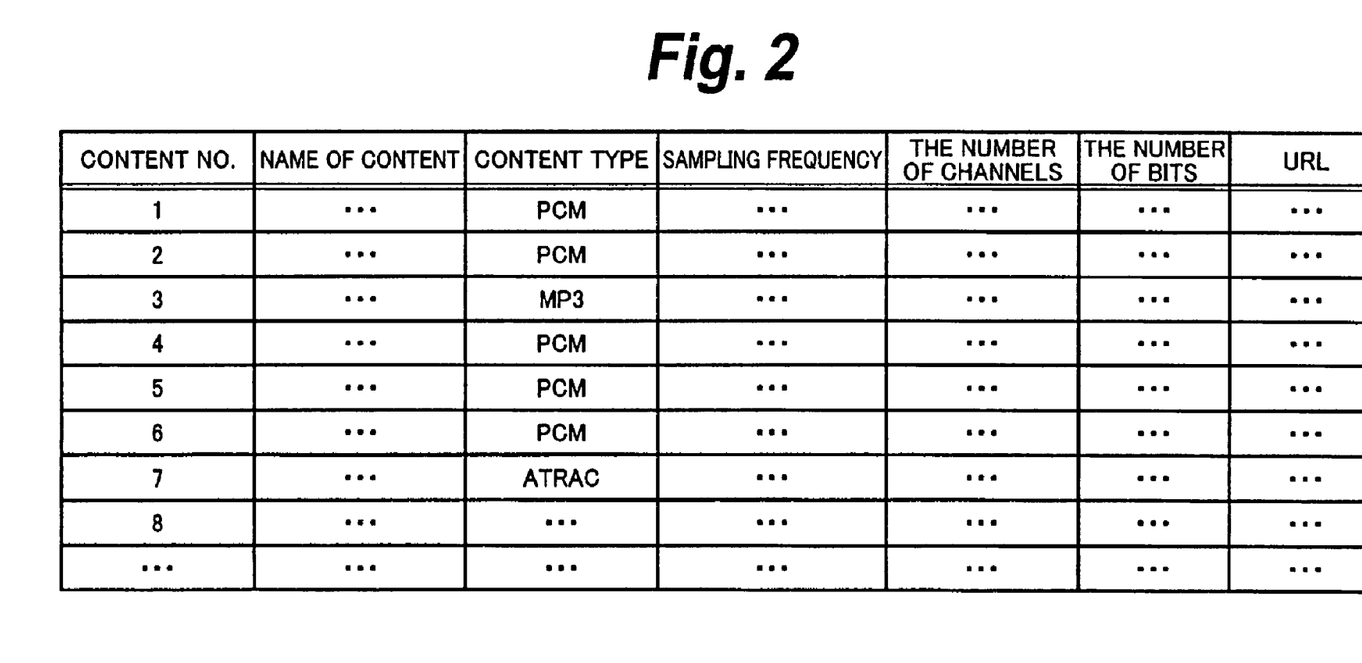
FIG. 2 is a schematic diagram showing an example of content information.

FIG. 2 shows an example of the content information stored in the content information storing unit 22. A content number is allocated to each music content. With respect to each content, a name of the content, a content type, a sampling frequency, the number of channels, the number of bits, and a URL (Uniform Resource Locator) have been held as content information. The content type indicates linear PCM, MP3, ATRAC, or the like. The sampling frequency indicates a sampling frequency of a digital music signal, for example, 48 kHz. The number of channels indicates "stereophonic 2 channels", "multichannel", or the like. The number of bits indicates the number of bits per sample, for example, 16 bits, 24 bits, or the like. The URL is provided for the client 3 to access the content for the server 2. It is unnecessary that all of those items exist. Another item such as a reproducing time may be provided.

The content information is transmitted to the client 3 from the server 2 and used to set a reproducing unit 33 of the client 3. In the embodiment, the compression-encoded music content is decoded in the server 2 and distributed to the client 3 as a linear PCM signal after the decoding.

Figure 3:
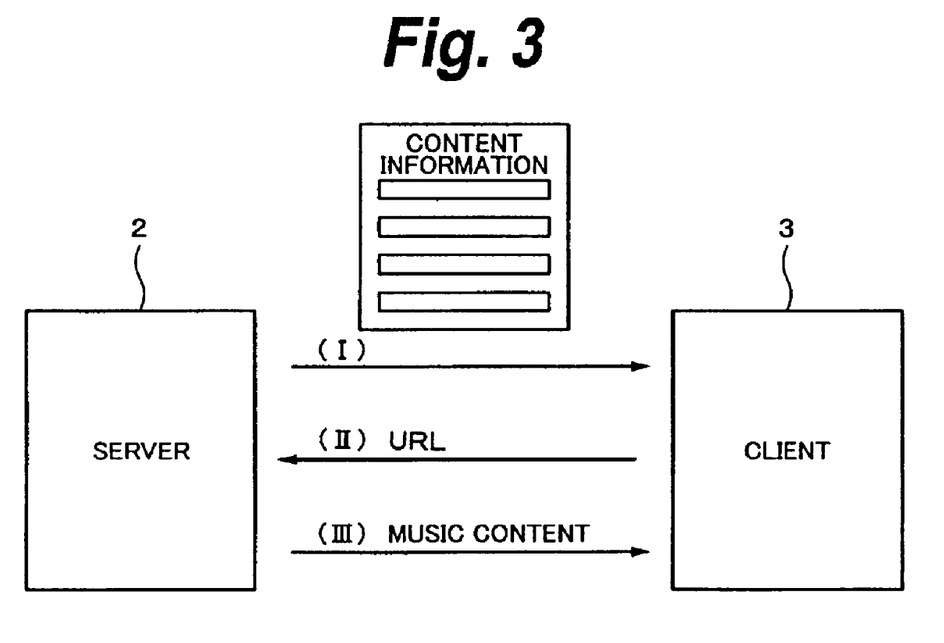
FIG. 3 is a block diagram showing an outline of a process for distributing music content.

FIG. 3 shows an outline of processes in the case where the music content stored in the content storing unit 21 is provided to the client 3 by the music content providing unit 24 music content providing unit 24. First, the music content providing unit 24 reads out the content information from the content information storing unit 22 as shown in FIG. 2. The read-out content information is transmitted to the client 3 through the communicating unit 23 (process I). The URL is included in the transmitted content information.

The client 3 who received the content information designates the music content which he wants to reproduce with reference to the content information. For example, the content information is displayed in a display unit of the client 3. A cursor is positioned to desired content information. By clicking here, the music content is designated. Information to specify the designated music content, for example, the URL is transmitted to the server 2 from the client 3 (process II).

The music content providing unit 24 reads out the music content data designated by the URL received from the client 3 through the communicating unit 23 from the content storing unit 21, and the read-out data is transmitted to the client 3 through the communicating unit 23 (process III). The client 3 has a construction, which will be explained hereinafter, and reproduces the received music content data.

As shown in FIG. 1, the client has a communicating unit 31 for communicating with the server 2. The music content data received from the server 2 is stored into a reception buffer 32 with a construction of a ring buffer. The reception data read out of the reception buffer 32 is supplied to the reproducing unit 33. The reproducing unit 33 has a D/A converter for converting the reception data into an analog music signal. The analog music signal which is outputted from the reproducing unit 33 is amplified by an amplifier 34 and reproduced by speakers 35. In the embodiment, the reproducing unit 33 is constructed by the D/A converter in order to receive the linear PCM signal. However, in a system to which the compression-encoded data is distributed, a decoder for decompression-decoding is provided for the reproducing unit 33.

Although not shown, a reception buffer for communication is provided for the communicating unit 31 separately from the reception buffer 32. The reception buffer for communication is provided to store the content data which is received by one communication. In this example, a data amount of the content data which is transmitted by one communication by the server, that is, a size of transmission buffer is assumed to be larger than a data amount of the content data which is received by the client 3, that is, a size of reception buffer for communication. Therefore, the server 2 separately transmits the content data stored in the transmission buffer to the client 3 a plurality of number of times.

A system control unit 36 to control the whole operation of the client 3 is provided. The following units are also provided: an input unit 37 for accepting the operation such as switching operation of the user, operation by a remote control apparatus, operation of a GUI (Graphical User Interface), or the like and supplying a signal corresponding to the operation to the system control unit 36; and a display unit 38 for displaying the received content information, displaying an operating mode of the client 3, or displaying a screen for the GUI. The system control unit 36 controls the operation of the client 3 in accordance with an operation signal from the input unit 37. That is, the communication with the server 2, the reproducing process of the received music content data, and the like are controlled by the system control unit 36.

The content reproducing operation in the foregoing content reproducing system 1 will be described. In response to the operation in the input unit 37, the system control unit 36 transmits a transmitting request of the content information to the server 2 and receives the content information from the server 2 as described as a process I in FIG. 3. The received content information is displayed on the display unit 38.

The user of the client 3 designates the music content which he wants to reproduce with reference to the displayed content information. The user may designate the content number of the music content by a key input or the like of the remote control apparatus or may move the cursor on the displayed content information and execute the deciding operation at a position of desired music content.

When the content is designated, the reproducing unit 33 is set so that the designated content can be reproduced. As described as a process II in FIG. 3, the information to designate the music content, for example, the URL is transmitted to the server 2. As described as a process III in FIG. 3, the server 2 reads out the designated music content data from the content storing unit 21 and transmits it to the client 3.

The music content data distributed from the server 2 is received by the client 3 and written into the reception buffer 32. The reproduction is started from the stage after completion of the writing of a predetermined amount of data which can be reproduced. The client 3 reproduces the music content while receiving the music content data.

FIGS. 4A to 4C and 5A to 5C are diagrams for explaining the operation of the embodiment by using the reception buffer 32 of the client 3. In FIGS. 4A to 4C and 5A to 5C, the reception buffer 32 has the construction of the ring buffer in which the writing and the reading can be executed in parallel. As shown by arrows, the writing position and the reading position sequentially change from the left edge to the right edge of the drawing. When the writing position and the reading position reach the right edge, they are returned to the left edge.

A write pointer is updated at a point of time when the writing has been finished and indicates a next writing start position. A read pointer indicates a reading start position. The read pointer is also updated in a manner similar to the write pointer. Further, a hatched region shows a region where the writing has already been performed and the reading is not performed yet in the reception buffer 32. A non-hatched region shows a reusable region where data can be overwritten.

Figure 4A:
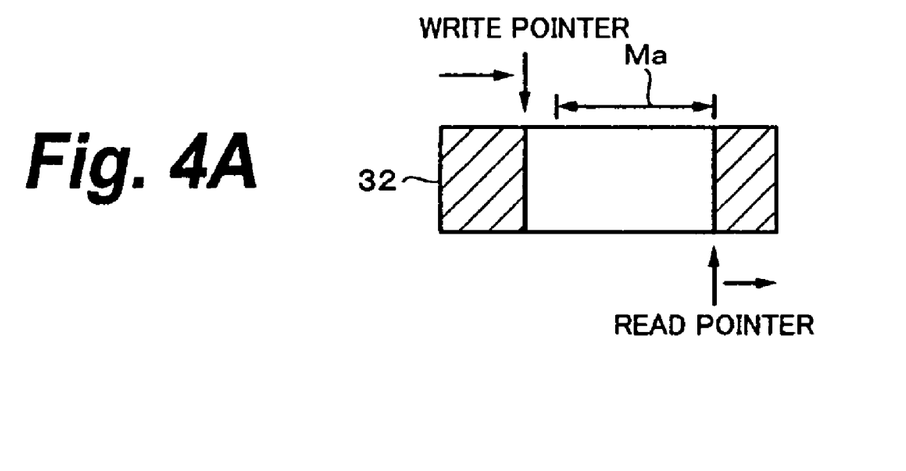
FIGS. 4A, 4B, and 4C are schematic diagrams showing writing and reading processes of a reception buffer in the embodiment of the invention.

FIG. 4A shows the operation of the reception buffer 32 upon reproduction. During the reproduction, the reading of the reproducing side is continuously executed at a predetermined period in the reception buffer 32. The music content data read out of the reception buffer 32 is D/A converted into the analog music signal by the reproducing unit 33. The analog music signal is reproduced from the speakers 35 through the amplifier 34. The reproduction is started from the stage when the music content data of an amount necessary for reproduction has been stored in the reception buffer 32.

The music content data received from the server 2 is written into the reusable area in the reception buffer 32. For example, a receiving/writing speed of the music content data received through the communicating unit 31 is assumed to be higher than that of the data which is outputted to the reproducing unit 33. Therefore, at a point where the read pointer has advanced the position obtained by adding a data amount which is equal to or larger than a predetermined data amount Ma to the position of the previous read pointer, the writing of the reception data is started and the position of the write pointer is updated. After that, the writing operation is waited until the read pointer advances the position obtained by adding the data amount which is equal to or larger than the predetermined data amount Ma to the position of the previous write pointer.

It is sufficient that the predetermined data amount Ma is equal to or larger than the size of reception buffer for communication of the client 3. In the invention, as will be explained hereinafter, in order to prevent interruption of the reproduction sound at the time of the pause cancellation, the reproduction is restarted after completion of the reception of the non-transmission data. Therefore, the predetermined data amount Ma is assumed to be equal to the size of transmission buffer of the server 2.

Besides the reproducing operation, the client 3 can also execute the operations such as stop, pause, and the like in response to the operation of the user in a manner similar to the case where they can be performed in a music player. Control in the case of performing the pause during the reproduction will be described hereinbelow.

In the client 3, if the user operates the input unit 37 and issues a pause instruction during the reproducing operation, the reading from the reception buffer 32 is stopped and zero data is sent to the D/A converter in the reproducing unit 33. Therefore, no sound is reproduced from the speakers 35. Information of a reproduction elapsed time until the pause is performed from the head of a music piece is held. The reproduction elapsed time is calculated on the basis of the amount of data sent from the reception buffer 32 to the reproducing unit 33 from the head of the music piece, the sampling frequency, the number of channels, and the number of bits. For example, the reproduction elapsed time is calculated up to the digit of ($1/1000$) second. In the case of the compression-encoded data, it is necessary to decode such data and measure an amount of decoded data which is sent to the D/A converter in the reproducing unit 33. Subsequently, the reception of the data from the server 2 is stopped while keeping the connection to the server 2.

When the apparatus enters the pause mode, the reception of the music content data is stopped. In the TCP, by setting the window size to 0, the data reception can be stopped. Since it is difficult for the server to transmit the data exceeding the window size, if the window size is set to 0, the transmission of the data is also stopped.

When the pause is cancelled by the user's operation in the client, the reading from the reception buffer 32 is restarted. The window size is changed from 0 to a predetermined size, thereby enabling the data reception. The read-out data is sent to the reproducing unit 33 and the reproduction of the music content is restarted.

A process upon pause cancellation different from that in the invention will now be described for reference. According to this process, upon pause cancellation, the data is first outputted from the reception buffer to the reproducing unit. Thus, since the read pointer is moved, the reusable area is formed in the reception buffer. The reception of the music content data from the server is restarted when the read pointer advances to the position obtained by adding the new reception data amount (for example, the size of reception buffer for communication) to the previous write pointer.

Such a method does not cause a problem in the state where the connection is continued. However, if the connection is disconnected on the server side, a problem occurs. If the amount of data which is transmitted and received once by the TCP on the server side is larger than that on the client side, when the data reception is stopped with the connection continued, the non-transmission data remains in the transmission buffer of the server.

The process to disconnect the connection by the application program of the server side is executed by setting FIN as a flag of the TCP to "1". In the process to disconnect the connection of the server side, if the non-transmission data remains in the transmission buffer, after the transmission data was transmitted, the cutting process is executed. When the client cancels the pause, the non-transmission data remaining in the transmission buffer of the server is sent to the client. Since the data is successively sent, the client regards that the connection is continued, and it starts the reproduction.

Subsequently, the FIN is set to "1" during or after the transmission of the non-transmission data and the connection is disconnected. The client requests the data of the music content after the disconnection of the connection from the server. A problem of a sound-cut in which no reproduction sound is temporarily obtained for a period of time during which the connection is established and the requested data is received from the server occurs.

The invention intends to solve such a problem that the sound is temporarily cut at the time of the pause cancellation when the non-transmission data remains as mentioned above.

Figure 6:
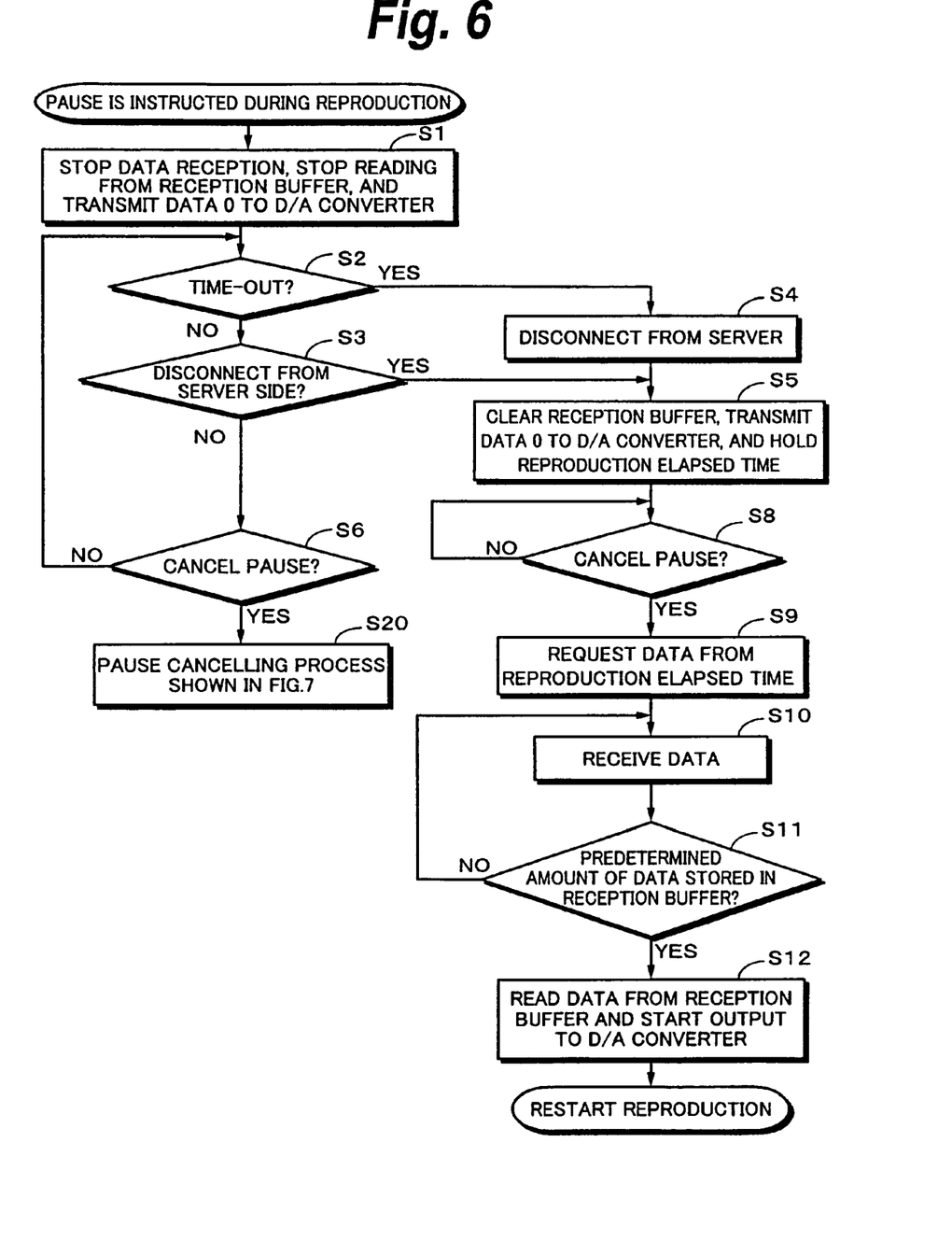
FIG. 6 is a flowchart showing a flow for processes in the case where the client instructs the pause in the embodiment of the invention.

First, the process when the pause is instructed will be described in more detail with reference to FIG. 6. This process is executed under the control of the system control unit 36 of the client 3. When the user instructs the pause by the input unit 37 during the reproducing operation, the apparatus enters the pause mode in step S1. That is, the data reception is stopped, the reading from the reception buffer 32 is stopped, and the data 0 is transmitted to the reproducing unit 33. Since the data 0 is transmitted, a silent mode is obtained. Since the linear PCM signal is received as music content data in the embodiment, the D/A converting process is executed in the reproducing unit 33. Therefore, the D/A converter is used as a terminology corresponding to the reproducing unit 33.

The stop of the data reception is executed by setting the window size of the TCP to "0". It is difficult for the server 2 which received the window size "0" to transmit new data until the window is opened. To maintain the connection, the server 2 transmits a probe segment to the client 3. The client 3 receives the probe segment and notifies the server 2 of the order number which is expected next and the present window size (that is, 0), thereby maintaining the connection.

In step S2, whether or not a predetermined time of, for example, 30 seconds has elapsed in the pause mode is discriminated. This discrimination is made to avoid an inconvenience which occurs because the connection that is not used exists for the predetermined time or longer, for example, a wasteful use of resources. If it is determined that the predetermined time does not elapse, whether or not the connection has been disconnected from the server 2 side is discriminated in step S3. If it is determined that the connection is not disconnected, whether or not the pause cancellation has been instructed is discriminated in step S6. If it is determined that the pause cancellation is not instructed, the control is returned to step S2 (discrimination about the elapse of the predetermined time). If it is determined in step S6 that the pause cancellation has been instructed, a process of step S20 is executed.

Figure 7:
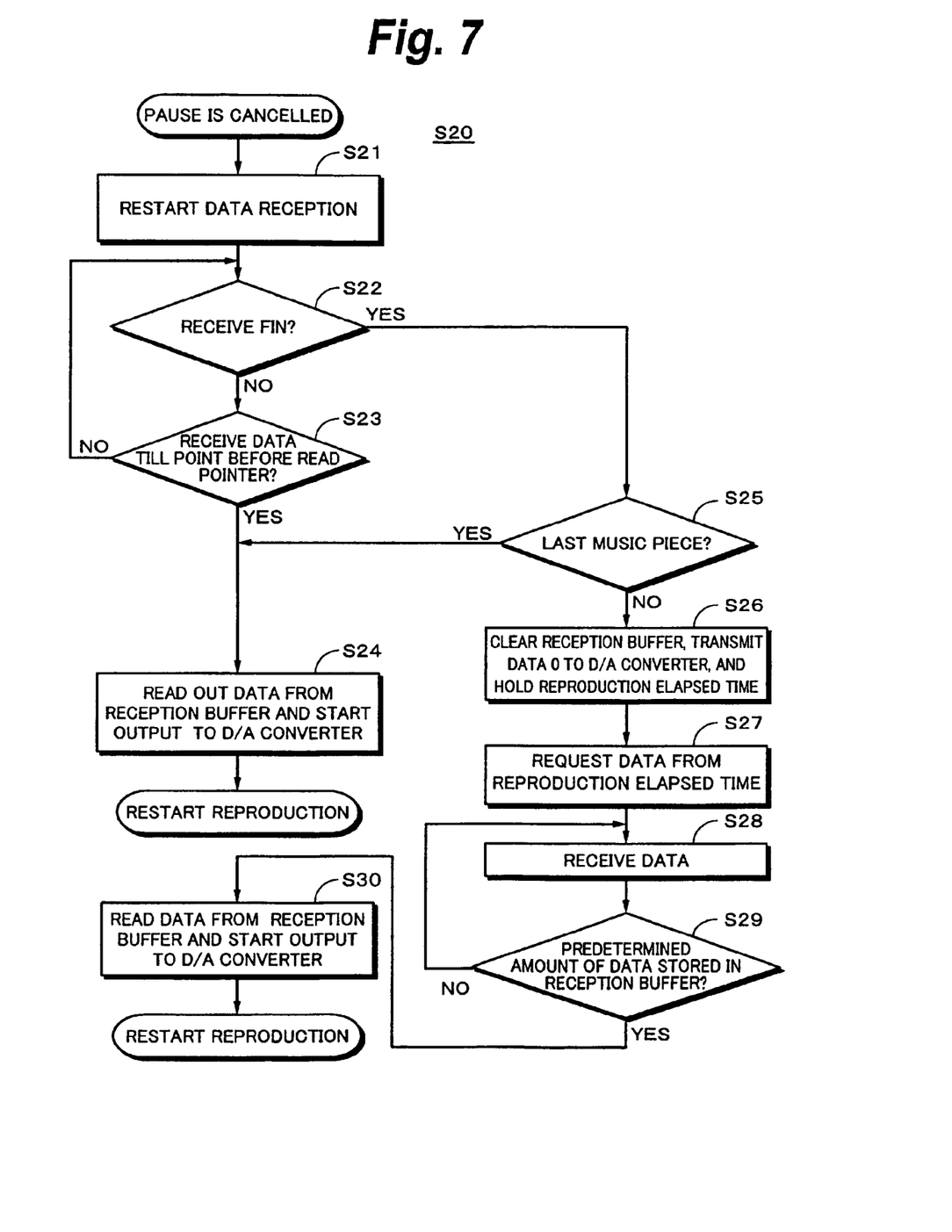
FIG. 7 is a flowchart showing a flow for processes in the case where the client instructs the pause cancellation in the embodiment of the invention.

The process of step S20 will be explained in detail hereinafter with reference to FIG. 7. Since the connection to the server 2 is not disconnected until the processing routine advances to step S20, the reception buffer 32 is not erased and the non-transmission data remaining in the transmission buffer is not abandoned. Therefore, by restarting the reception from the non-transmission data, the reproduction can be immediately restarted from the same position. However, as mentioned above, if the connection is disconnected by the application program of the server after the cancellation of the pause in step S6, the problem of the sound-cut occurs. Therefore, whether or not the connection has been disconnected after the restart of the data reception is discriminated and the proper process is executed in step S20.

If it is determined in step S2 that the predetermined time has elapsed, the client 3 disconnects the connection to the server 2 in step S4. Since the connection is disconnected, the non-transmission data remaining in the transmission buffer of the server 2 is abandoned. In step S5, the data held in the reception buffer 32 is erased and the transmission of the data 0 to the D/A converter is continued. The reproduction elapsed time until the pause is performed from the head of the music piece is calculated on the basis of the amount of data transmitted to the D/A converter from the reception buffer 32, the sampling frequency, the number of channels, the number of bits, and the like. The obtained reproduction elapsed time is held. If it is determined in step S3 that the connection has been disconnected from the server 2 side, the process of step S5 is also executed.

After the process of step S5, whether or not the pause cancellation has been instructed is discriminated in step S8. If it is determined that the pause cancellation has been instructed, the client 3 requests the content data of the packet including the reproduction elapsed time from the server 2 from the information of the pause position in step S9. The server 2 transmits the content data including the reproducible packet from the reproduction elapsed time.

The client 3 receives the data from the server 2 (step S10). Whether or not a predetermined amount of data necessary for reproduction has been stored in the reception buffer 32 is discriminated in step S11. If it is determined that the predetermined amount of data has been stored in the reception buffer 32, the output of the data from the reception buffer 32 to the D/A converter is started in step S12. As mentioned above, the reproduction from the pause position is started.

Figure 4B:
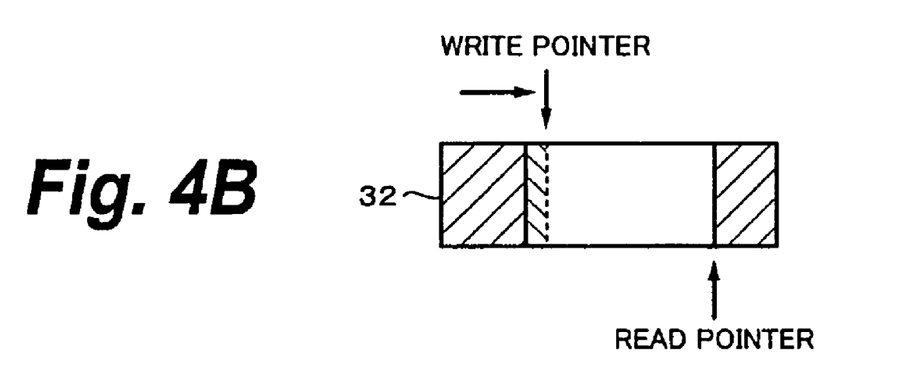

The process of step S20 will now be described with reference to FIGS. 4A to 4C, 5A to 5C, and 7. If it is determined in step S6 that the pause has been cancelled, the data reception is restarted in step S21. The state just after the pause cancellation is shown in FIG. 4B. The reading is not started yet and only the writing is executed.

Figure 4C:
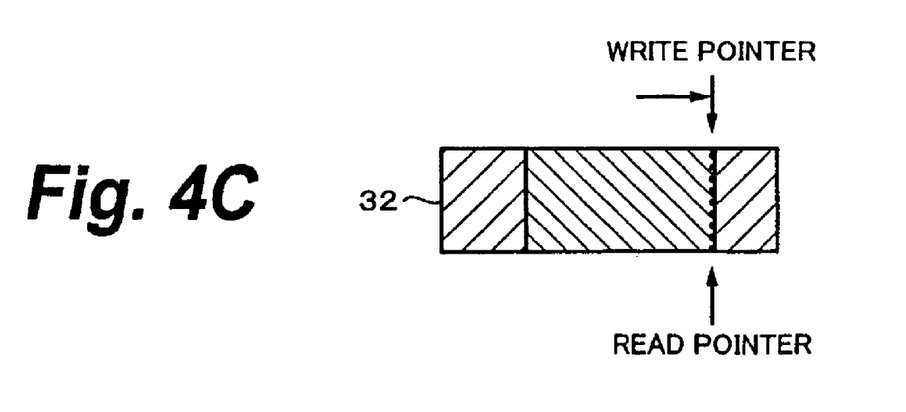

Whether or not the flag FIN (="1") has been received from the server 2 is discriminated in step S22. That is, whether or not the connection has been disconnected is discriminated. If it is determined that the flag FIN is not received, whether or not the data up to the position before the read pointer has been received is discriminated in step S23. FIG. 4C shows the state where the data up to the position before the read pointer has been received.

Figure 5A:
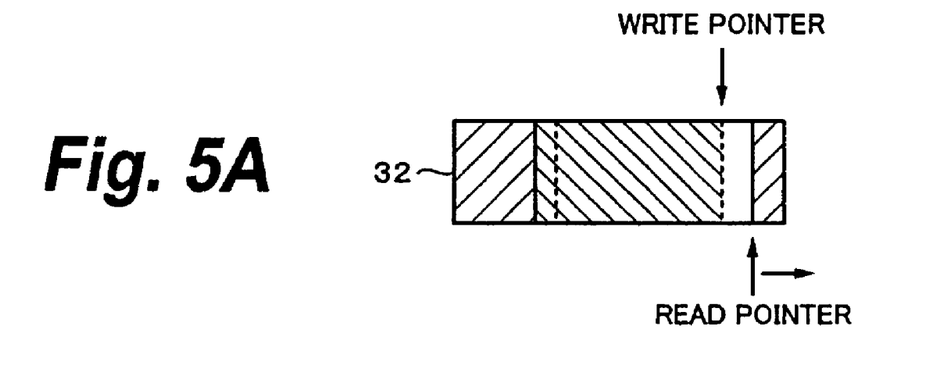
FIGS. 5A, 5B, and 5C are schematic diagrams showing the writing and reading processes of the reception buffer in the embodiment of the invention.

If it is determined that the data up to the position before the read pointer has been received, the data is read out of the reception buffer 32 and outputted to the D/A converter in step S24. Therefore, the reproduction sound is reproduced from the speakers 35 and the reproduction is restarted. In step S24, the reading is executed as shown in FIG. 5A and the writing is waited until an interval between the write pointer and the read pointer is equal to or larger than the size of transmission buffer of the server. The read-out data is outputted as a reproduction sound. After that, the writing and the reading of the reception buffer 32 are executed in a manner similar to the reproducing operation.

If it is determined in step S22 that the client has received the flag FIN (="1") from the server 2, whether or not the data up to the end of the music piece has been received is discriminated in step S25. The process in which the server 2 has transmitted the data up to the end of the music piece and has transmitted the flag FIN and the connection is disconnected is a normal disconnecting process. On the other hand, the process in which the server 2 does not transmit the data up to the end of the music piece and the connection is disconnected is an abnormal disconnecting process. Whether or not the data up to the end of the music piece has been received can be discriminated by, for instance, comparing the data amount of the music piece which can be known by the content information such as a total playing time with the transmission data amount to the D/A converter.

If it is determined in step S25 that the data up to the end of the music piece has been received, the processing routine advances to step S24. In step S24, a process for reading out the data from the reception buffer 32 and outputting the read-out data to the D/A converter is executed.

Figure 5B:
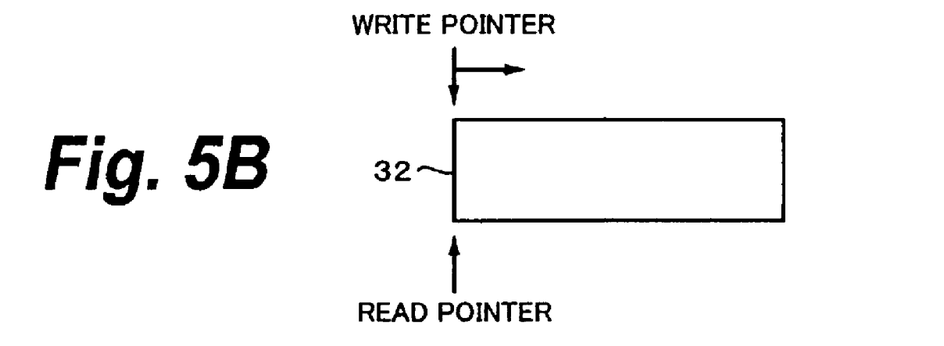

If it is determined in step S25 that the data up to the end of the music piece is not received but the disconnecting process has been executed, in step S26, the reception buffer 32 is erased. The zero data is outputted to the D/A converter. The measurement of the reproduction elapsed time is continued and the measured reproduction elapsed time is held. FIG. 5B shows the state where the reception buffer 32 has been erased. Both of the write pointer and the read pointer are located at an initial position.

After the process of step S26, the client 3 calculates the reproduction elapsed time from the information showing the pause position and requests the content data in which the reproducing time is set to the timing for starting the reproduction from the server 2 in step S27. The server2 transmits the content data including the reproducible packet from the reproduction elapsed time.

Figure 5C:
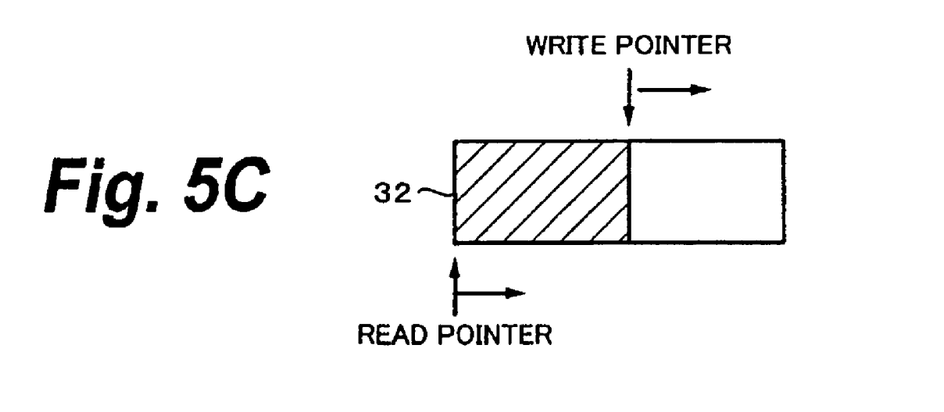

The client 3 receives the data from the server 2 (step S28). Whether or not the predetermined amount of data necessary for reproduction has been stored in the reception buffer 32 is discriminated in step S29. If it is determined that the predetermined amount of data has been stored in the reception buffer 32, the output of the data from the reception buffer 32 to the D/A converter is started in step S30. FIG. 5C shows the reproducing operation of step S30. In this manner, the reproduction from the pause position is started.

As mentioned above, when the reproduction of the music which is being reproduced is temporarily stopped, since the client 3 controls the pause operation, the reproduction can be restarted from the same position by cancelling the pause within the predetermined time. In the case where the reproduction of the music has temporarily been stopped and this stop state is continued for the predetermined time or longer, since the information of the reproduction elapsed time has been held, the reproduction can be restarted from the same position. Even in the case where the connection has been disconnected by the application program of the server 2 because the pause state is continued for the predetermined time or longer or the server 2 has executed another process with a high priority, since the information of the reproduction elapsed time has been held, the reproduction can be restarted from the same position. Further, since the information of the reproduction elapsed time is held on the client 3 side, a load of the server 2 can be lightened.

Further, in the case where the pause has been cancelled, the data reception is restarted, the writing into the reception buffer is executed first, and the connection is not disconnected from the server side, the data up to the position before the read pointer is received and the reading is subsequently started. In the case where the pause has been cancelled, the data reception is restarted, and the connection is disconnected from the server side before the data up to the position before the read pointer is received, whether the disconnection has been made on the way of the music piece or in the end of the music piece is discriminated. If it is decided that the disconnection has been made on the way of the music piece, the reception buffer 32 is erased and the client requests the data from the position of the pause cancellation from the server 2 and newly receives the data. After the data of the predetermined amount or more was stored in the reception buffer 32, the data is read out and the reproduction is restarted.

Therefore, since the non-transmission data remaining in the transmission buffer at the point of time of the pause is fetched into the reception buffer by the pause cancellation, the reproduction is restarted and, thereafter, the connection is disconnected. Thus, the occurrence of the temporary interruption of the sound due to the stop of the reproduction can be prevented.

It should be understood by those skilled in the art that various modifications, combinations, sub-combinations and alterations may occur depending on design requirements and other factors insofar as they are within the scope of the appended claims or the equivalents thereof. For example, a protocol other than the TCP may be used.

What is claimed is:

1. A content receiving apparatus comprising:
   a communicating unit connecting to a server over a connection;
   a reception buffer receiving content data transmitted from said server through said communicating unit and storing the received content data;

a content reproducing unit reproducing the content data read out of said reception buffer after a predetermined amount of the content data is stored in the reception buffer;

a control unit controlling said communicating unit and said reception buffer; and an operating unit supplying an operation signal to said control unit, wherein said control unit:

stops reception of said content data and stops an output of the content data to said reproducing unit from said reception buffer in response to a reproduction temporary stop instruction which is supplied from said operating unit;

restarts the reception of said content data in accordance with a reproduction temporary stop cancellation instruction which is received from said operating unit and writes said received content data into said reception buffer;

discriminates whether or not a signal to disconnect the connection has been received from said server after the reproduction stop cancellation instruction is received and before the predetermined amount of said content data is stored in the reception buffer;

when said signal to disconnect the connection is not received, writes the predetermined amount of the content data into said reception buffer, and thereafter, starts reading from said reception buffer, outputs read-out data to said reproducing unit, and restarts the reproduction; and when the signal to disconnect the connection is received, determines whether data up to an end of a music piece of the content data has been received from the server, and, when the data up to the end of the music piece has not been received, clears the reception buffer.

2. The apparatus according to claim 1, wherein when said signal to disconnect the connection is received after the restart of the reception of said content data, said control unit discriminates whether or not all of requested content data has been received, and if it is determined that the data up to the end of the music piece is not received, said control unit requests remaining data of the music piece from said server, receives the remaining requested data, outputs the received data to said reproducing unit, and restarts the reproduction.

3. The apparatus according to claim 1, wherein when said server disconnects said connection, non-transmission data remaining in a transmission buffer of said server is received.

4. The apparatus according to claim 1, wherein said predetermined amount of the content data is equal to or larger than a data amount corresponding to a size of a transmission buffer of said server, and at a time of a reproducing operation, writing and reading of said reception buffer are controlled so that an area for writing said predetermined amount of the content data exists.

5. The apparatus according to claim 2, wherein an amount of data of content outputted from said reception buffer to said reproducing unit from a head of the content is detected, and whether or not all of said requested content data has been received is discriminated by comparing said detected amount of data with a total data amount of the content.

6. The apparatus according to claim 1, wherein if a continuation time of an operation for said reproduction temporary stop instruction is equal to or longer than a predetermined time, a process to disconnect the connection to the server is executed, and in an operation for said reproduction temporary stop cancellation instruction, the remaining data after said reproduction temporary stop instructing operation is requested and the requested data is received and reproduced.

7. A content receiving method comprising:

a reproducing step of receiving content data from a server, writing the content data into a reception buffer, reading out the content data from said reception buffer after a predetermined amount of the content data is stored in the reception buffer, and outputting the read-out content data to a reproducing unit;

a step of generating a reproduction temporary stop instruction in said reproducing step;

a reproduction temporary stopping step of stopping reception of said content data and stopping an output of the content data to said reproducing unit from said reception buffer in response to said reproduction temporary stop instruction instructing to stop reproducing the read-out content data;

a step of restarting the reception of said content data in accordance with a reproduction temporary stop cancellation instruction instructing to resume reproducing the read-out content data and writing said received content data into said reception buffer;

a step of discriminating whether or not a signal to disconnect a connection has been received from said server after the reproduction stop cancellation instruction and before a predetermined amount of said content data is stored in the reception buffer;

a step of, when said signal to disconnect the connection is not received, writing the predetermined amount of received content data into said reception buffer, thereafter, starting reading from said reception buffer, outputting the read-out data to said reproducing unit, and restarting the reproduction; and a step of, when the signal to disconnect the connection is received, determining whether data up to an end of a music piece of the content data has been received from the server, and, when the data up to the end of the music piece has not been received, clearing the reception buffer.

8. The method according to claim 7, further comprising a step of, when said signal to disconnect the connection is received, discriminating whether or not all of requested content data has been received, and if it is determined that it is difficult to receive all of the requested content data, requesting remaining content data from said server, receiving the requested data, outputting the received data to said reproducing unit, and restarting the reproduction.

9. The apparatus according to claim 1, wherein, when the data up to the end of the music piece has not been received from the server and after the control unit clears the reception buffer, the control unit requests the music piece from the server.

10. The apparatus according to claim 9, wherein the control unit requests the music piece from the server based on a time elapsed between a beginning of outputting of the music piece from the reception buffer and the reproduction temporary stop instruction.

11. The apparatus according to claim 10, wherein, after the predetermined amount of the content data has been written into the reception buffer, the control unit reads the content data from the reception buffer, outputs the read data to the reproducing unit, and restarts reproduction.

12. The apparatus according to claim 10, wherein the control unit uses the time to restart reproduction of the music piece.

13. The apparatus according to claim 1, wherein the content data comprises music content data.

14. The apparatus according to claim 1, wherein the reception buffer comprises a ring buffer.

15. The method according to claim 7, further comprising tracking a time elapsed between a beginning of outputting of the music piece from the reception buffer and the reproduction temporary stop instruction.

16. A device, comprising:
a communicating unit configured to connect the device to a server over a connection;
a reception buffer configured to receive content data transmitted from the server and store the received content data;
a reproducing unit configured to reproduce the content data stored in the reception buffer after a predetermined amount of the content data is stored in the reception buffer; and
a control unit configured to:
in response to a reproduction stop instruction,
stop reception of the content data from the server;
stop output of the content data from the reception buffer to the reproducing unit;
in response to a reproduction stop cancellation instruction,
restart the reception of the content data from the server;
determine whether the connection has been disconnected after the reproduction stop cancellation instruction is received and before the predetermined amount of the content data is stored in the reception buffer data;
when it is determined that the connection has not been disconnected,
write the predetermined amount of the content data into the reception buffer, and
initiate reading of the content data from the reception buffer; and
when it is determined that the connection has been disconnected, and when it is determined that a music piece of the content data has been partially received from the server and stored in the buffer before the connection has been disconnected, clear the reception buffer that stores the partial content of the music piece.

17. The device according to claim 16, wherein, when the entire content of the music piece has not been received from the server and after the control unit clears the reception buffer, the control unit requests the music piece from the server.

18. The device according to claim 16, wherein the control unit is further configured to track a time elapsed between a beginning of outputting of the music piece from the reception buffer and the reproduction temporary stop instruction.

19. The device according to claim 18, wherein the control unit uses the tracked time to restart the reproduction of the content data from a position in the content data corresponding to the tracked time.

* * * * *